April 13, 1965 — R. D. DEMO — 3,177,594
LEARNING LABORATORY AUDIO DISTRIBUTION APPARATUS
Filed Feb. 14, 1963

INVENTOR:
RAYMOND D. DEMO,
BY *Marvin L. Goldberg*
HIS ATTORNEY.

United States Patent Office 3,177,594
Patented Apr. 13, 1965

3,177,594
LEARNING LABORATORY AUDIO DISTRIBUTION APPARATUS
Raymond D. Demo, Liverpool, N.Y., assignor to General Electric Company, a corporation of New York
Filed Feb. 14, 1963, Ser. No. 258,442
2 Claims. (Cl. 35—35)

This invention relates to selective audio signal distribution apparatus for the teacher's control console of learning laboratories. More specifically, this invention relates to such distribution apparatus in learning laboratories having a plurality of student stations and multiple instructive program input signals.

A most effective and efficient technique of modern education is the learning laboratory. In a learning laboratory there is employed communication and recording equipment together with pre-recorded instructive programs for enabling a single teacher to more effectively instruct a large number of students. Thus, flexibility and efficiency is provided in the teaching process whereby, for example, the teacher is able to instruct simultaneously a number of students, and to provide individual student instruction as needed without disturbing the remainder of the students.

It is frequently essential or highly desirable to provide a learning laboratory having a number of instructive programs, such as required to meet the needs of a class of students having varied abilities and prior achievement in a single subject being taught, or to teach more than one subject at a given time to selected groups of students. When a multiplicity of instructive programs are available, it is imperative that the teacher have some means of channeling a particular desired program to each individual student station.

In addition to providing means for the teacher to select a particular instructive program for selected groups of students within the class, it is also necessary that the teacher be able to monitor, record the response of and communicate with the individual students. It is desirable that these various functions be performed with a minimum of disturbance to the class of students generally and without disturbing the setting of the instructive program selector. It is also desirable that the teacher be able to monitor or record the response of a particular student without the student's knowledge. In addition, it is highly advantageous that the above described functions be performed by selector apparatus of minimum structural and operational complexity, which is economical of consumed space and yet provides a clearly legible indication of the selector positions.

It is, accordingly, an object of my invention to provide in a learning laboratory having a plurality of student stations and in which there are utilized a plurality of instructive program signals, an improved audio distribution apparatus of compact construction at the teacher console for selectively coupling said program signals to said student stations.

It is a further object of my invention to provide in a learning laboratory as above described in which it is also desired to selectively monitor and record responses made at each student station and to communicate between the teacher console and the student stations, an improved audio distribution apparatus of compact construction at the teacher console for selectively coupling said program signals to said student stations and for efficiently providing additional control functions such as with respect to said monitoring, recording and communication functions.

It is still a further object of my invention to provide an improved audio distribution apparatus of the type described which efficiently permits the performance of said additional control functions of monitoring and recording without causing interference with the transmission of said input signals to said student stations.

It is another object of my invention to provide an improved audio distribution apparatus of the type described which performs the recited control functions with a minimum of complexity of the apparatus structure and operation.

In accordance with a preferred embodiment of my invention, these and other objects are accomplished by an audio distribution apparatus, one for each student station, each including a mechanically independent program selector means positioned by an outer control knob of transparent material, and a two pole or two section function selector means ganged to operate together in accordance with the position of an inner control knob. Said program and function selector means are mounted in a coaxial arrangement. Selector position indicia are scribed on a planar mounting support under the outer knob, through which said indicia are clearly visible. Corresponding indicia scribed on both control knobs indicate the angular position of each knob. A plurality of instructive program signals are connected to the stator contacts of the program selector which are selectively engaged by a contact disposed on the rotor of said selector. The selected program is conducted to three of four stator contacts of the first section of the function selector, the rotor contact of this section being connected to the associated student station audio input. The three stator contacts are engaged by the rotor contact in a "make-before-break" switching action such that no electrical discontinuity attends switching between the three positions. This insures that the student is unable to detect the switching. The fourth contact is connected to the teacher's audio output, and is engaged by the rotor contact when providing communication between the teacher and the student. When engaging the fourth contact a "break-before-make" switching action is effected which ensures that other students receiving the same instructive program will not be disturbed when the teacher desires to communicate with a particular student. The second section of the function selector has four stator contacts in positions corresponding to the four stator contacts of said first section. Its rotor contact is connected to the output from the student station. The first stator contact of the third section is connected to the teacher's recorder. The second contact is connected to the teacher's audio input for monitoring purposes, and the third contact has no connection and represents normal operation wherein the student's output line is open-circuited. The fourth contact is connected to the teacher's audio input to allow the teacher to hear the student's responses to the teacher's remarks as communicated through the first section of the switch when in the corresponding position.

Although the novel features which are believed to be characteristic of this invention will be pointed out with particularity in the claims appended hereto, the invention itself, its objects and advantages, the manner of its organization and the mode of its operation will be better understood by referring to the following description taken in connection with the accompanying drawing forming a part thereof in which:

FIGURE 1 shows the basic block diagram of a learning laboratory illustrating the environment of the present invention. Only the audio voltage conducting lines are shown interconnecting the various blocks, to emphasize the various audio switching which is required at teacher's control panel 1.

Figure 1:
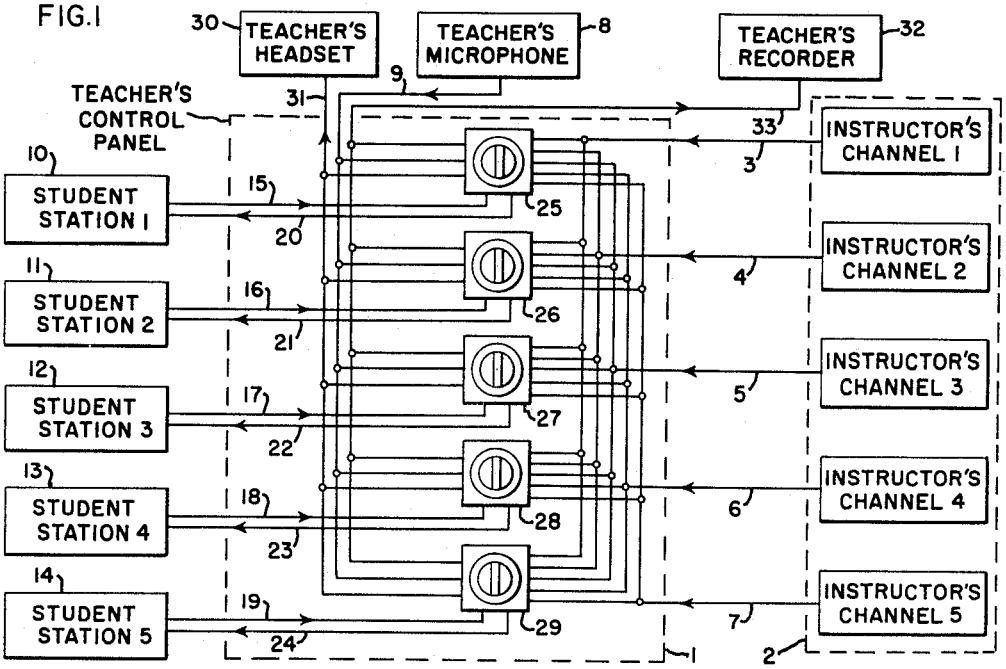
FIGURE 1 is a block diagram of a learning laboratory.

Instructive program source 2 provides a plurality of instructive programs to teacher's control panel through interconnecting lines 3, 4, 5, 6 and 7. Instructive program source 2 normally includes a plurality of reproducing apparatus, such as tape recorders, for providing previously recorded instructive programs. Preferably, the instructive program source has low impedance outputs and includes amplifiers and associated audio voltage level adjusting means, as is well known in the art. A low impedance source reduces cross-talk and other interference in large audio distribution systems, such as learning laboratories. The block diagram shows five distinct instructive program inputs; however, it will be understood that the invention is not limited thereto and may extend to systems having more or fewer separate programs.

Other inputs to teacher's control panel 1 include the teacher's audio output device 8, which may be a microphone or a microphone and amplifier in combination. Line 9 connects the teacher's audio output to the teacher's control panel. Five student stations 10, 11, 12, 13 and 14 are shown, the audio outputs of which are connected to the teacher's control panel 1 through respective conductors 15, 16, 17, 18 and 19. The student stations also receive audio signals from teacher's control panel 1 via lines 20, 21, 22, 23 and 24. It may be appreciated that the number of student stations may be other than five and in a typical learning laboratory would be on the order of thirty.

In normal operation of the learning laboratory, each of student input lines 20 to 24 is conductively associated with one of lines 3, 4, 5, 6 or 7, as determined by the arrangement of the audio distribution selector switches 25, 26, 27, 28 and 29, there being provided one selector switch for each student station. This connection is shown more clearly in FIGURE 2. The instructive program at each student station is supplied to some form of audio transducer, not shown, such as a headset, enabling the student to hear the instructive material. Frequently, each student station includes a tape recorder, not illustrated, upon which the instructive material is recorded for later play-back by the student. Preferably, such a tape recorder is of the dual track variety wherein the instructive message will be recorded on one track and the student response recorded on the other track, allowing a comparison by the student and resultant self-evaluation of his performance. In the normal mode of operation, the student output lines 15 to 19 are open-circuited, and the student is thus engaging in self-teaching without aid from the teacher, as shown more clearly in FIGURE 2.

The audio distribution selector switches 25 to 29 at the teacher's control panel 1 not only provide for individual and independent switching to distribute one of the instructive programs in lines 3 to 7 to each student position, but also provide switching to enable the teacher to monitor the students individually and thereby evaluate their progress in learning. For this purpose, a teacher's audio input device 30, illustrated as a headset, is provided and served by conductor 31 extending between the control panel 1 and teacher's audio input 30. Connection is made to conductor 31 from the audio output lines 15 to 19 by means of the proper setting of selector switches 25 to 29, respectively, as indicated in FIGURE 2.

In another mode of operation, the teacher is enabled to communicate with the students through the teacher's audio output from the device 8 as conducted through line 9 which is selectively connected to one or more of the student audio input lines 20 to 24 by switches 25 to 29, respectively. At the same time, the teacher is able to hear the student's response as communicated via one or more of the lines 15 to 19, selectively connected to line 31 to provide an input to the teacher's audio input device 30.

In still another mode of operation, by means of switches 25 to 29 lines 3 to 7 from program source 2 are selectively connected to individual ones of student audio input lines 20 to 24, and the students' output may be selectively recorded by the teacher by connecting one of the student audio output lines 15 to 19 to the teacher's recorder 32 through line 33. In this mode of operation, the teacher is able to record the response of an individual student as he progresses in the selft-teaching experience offered by the learning laboratory.

Figure 2:
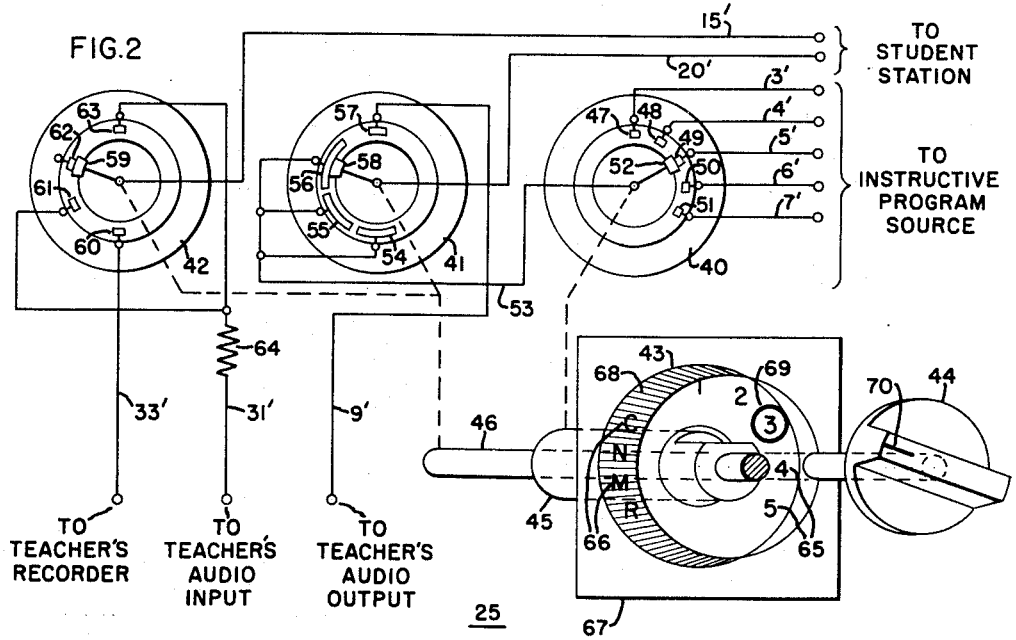
FIGURE 2 is a schematic diagram of one student audio distribution apparatus, such as is employed in the learning laboratory of FIGURE 1, including the switch contact arrangement, knob controls and wiring circuit.

The foregoing operative functions, and others, are readily and effectively accomplished by a novel switching arrangement as embodied in the selector switches 25 to 29, one of which is schematically illustrated in detail in FIGURE 2. As will be best appreciated when considering FIGURE 2, these switches are of a ready and compact construction which provide a relatively complex switching function in a direct and efficient manner. In addition, switching is accomplished with respect to the monitoring and recording functions in a manner such that the audio signals from the program source 2 are uninterrupted with the obvious advantage that these functions can be performed without the knowledge of the students.

FIGURE 2 shows, schematically, a detailed switching assembly of one of the audio distribution selector switches illustrated in FIGURE 1, specifically the switch 25 being illustrated. The switch is shown comprising switching sections 40, 41 and 42. Switching section 40 performs as a program switching means and mechanically dependent switching sections 41 and 42 perform as function switching means to select the various teacher functions. The switching sections are preferably coaxially mounted, although not necessarily so, and controlled by coaxial positioning knobs 43 and 44 disposed on the panel of the teacher's console, knobs 43 and 44 being joined to concentrically mounted shafts 45 and 46, respectively. Control knob 43 controls the position of switching section 40, as indicated by the broken line, to select a particular program. Knob 44 controls the position of switching sections 41 and 42, which are ganged as illustrated by the broken lines to these sections, to select a particular teacher function. Although shown in two sections for purposes of illustration, the function switching means may readily be constructed as a single two pole section. For example, these sections may be disposed on a single circular assembly with the contacts of each arranged to occupy either half of the assembly.

The stator of switching section 40 includes a plurality of stator contacts 47, 48, 49, 50 and 51. Stator contacts 47 to 51 are connected to conductors 3' to 7', respectively, which correspond to conductors of similar reference number in FIGURE 1, for supplying a plurality of signals from the instructive program source. It is apparent that the number of individual programs may be more or fewer than the five shown. A rotor contact 52 of switching section 40 may be rotated to engage any one of the stator contacts 47 to 51 for the desired program selection.

Rotor contact 52 of switching section 40 is connected through line 53 to stator contacts 54, 55 and 56 of four-position switching section 41, the fourth stator contact being numbered 57. Rotor contact 58 of switching section 41 is connected to the associated student station through audio input line 20', which corresponds to line 20 of FIGURE 1. Rotor contact 58 is gang coupled to rotor contact 59 of switching section 42 which is also a four-position switch having stator contacts 60, 61, 62 and 63. Stator contacts 60 to 63 are seen to correspond in position to stator contacts 54 to 57, respectively, of section 41. Rotor contact 59 is connected to the audio output line 15' of the student station. When rotor contact 58 of switching section 41 is in either of the three positions contacting one of stator contacts 54, 55 or 56, rotor contact 59 is in a corresponding position contacting one of stator contacts 60, 61 or 62, respectively. The program selected by the position of rotor contact 52 of switching section 40 is supplied to the input of the associated student station and one of the teacher functions provided by switching section 42 may be performed. In the position shown in FIGURE 2, wherein rotor contacts 58 and 59 engage stator contacts 56 and 62, respectively, the student output line 15' is open-circuited. This is the normal mode of operation and the position is designated the normal position N. In the monitor position M, the rotor contact 59 is positioned to engage stator contact 61. The student response from output line 15' is thereby by means of conductor 31' and isolating resistor 64 to the teacher's audio input. This connection allows the teacher to hear the student responses to the selected instructive programs supplied through contacts 58 and 55 of switching section 41. In the record position R, the rotor contact 59 engages stator contact 60 and the student responses are supplied through line 33', coupled to contact 60, to the teacher's recorder. A record of the student response accordingly may be made.

A "make-before-break" switching action occurs when switching between stator contacts 54, 55 and 56. This is schematically illustrated by stator contacts 54, 55 and 56 being sufficiently wide so that the intervening gaps are bridged by rotor contact 58. Such action is desirable to enable switching between these three positions without causing discontinuity of the instructive program circuit while changing the setting of section 42 to provide the different teacher functions. The teacher is thereby enabled to switch between the first three positions of switching sections 41 and 42 without detection by the student. It may be noted that contacts 54 to 56 can be replaced by a single conductive strip. In practice, however, separate contacts are employed to provide greater uniformity between the switching sections, or poles as the case may be, for ease of fabrication.

In the fourth position of switching sections 41 and 42, which is the communication position C, the contacts 58 and 59 engage stator contact 57 and 63, respectively. The audio input of the student station is disconnected from the program source and connected to the teacher's audio output through line 9' by means of switching section 41. The audio output from the student station is connected to the teacher's audio input through line 31' by means of section 42 and a two way communication is provided. Break-before-make switching action occurs when switching between contacts 56 and 57 so as to ensure that the teacher's audio output will not be connected to unselected student audio inputs.

It may be appreciated that the positioning knob construction allows a compact mounting of the switch assembly, while at the same time providing large legible indicia for showing the knob positions. As shown, the outer positioning knob 43 is of a transparent cylindrical construction through which two sets of indicia 65 and 66 scribed on a support panel 67 are clearly visible. Positioning knob 43 is formed with a knurled periphery, such as indicated at 68, to facilitate turning thereof. The position of the knob 43 is indicated by the indicia number, such as at 65, appearing through indicia ring 69, which is scribed in the under surface of knob 43. The rotor of switching section 40 is fixed to knob 43 through shaft 45 and turns therewith.

The inner positioning knob 44 is secured to shaft 46 for positioning the rotors of switching sections 41 and 42. Positioning knob 44 has an indicia line 70 scribed thereon which aligns with one of the indicia, such as shown at 66, to indicate the setting of knob 44 and its associated rotors of switching sections 41 and 42. It is apparent that the arrangement shown provides a compact assembly which requires a minimum of panel space on the teacher's console, while at the same time, offering a maximum of legibility by providing large indicia.

The advantages enjoyed by using the teaching of this invention will be apparent to those skilled in the language teaching art. A switching arrangement has been disclosed wherein separate instructive program selection and function switching is possible. The response of a student may be monitored or recorded without the student having knowledge of such occurrence, and the teacher is also able to communicate to the student without disturbing the program selector switch or disturbing other students utilizing the same program. These advantages are all achieved in an assembly of simple construction and operation. The assembly may be coaxially disposed, as shown in the specific embodiment described, wherein a minimum of panel space is required and yet no sacrifice of legibility has been made for the compact control assembly achieved.

A number of modifications and variations of this invention are possible and will occur to those skilled in the art. It is intended that the appended claims cover all such modifications and variations that fall within the true scope of the invention.

What is claimed as new and desired to be secured by Letters Patent of the United States is:

1. For use in a learning laboratory having a source of a plurality of instructive program signals, a teacher audio input means, output means and recording means and a plurality of student stations each having student audio input and output means; audio signal distribution apparatus for each of said student stations, each of said distribution apparatus comprising:
   (a) multiple position program selector means having a plurality of contacts each connected to one of said program signals and a single contact for selectively engaging said plural contacts,
   (b) multiple position function selector means having a first plurality of three stationary contacts selectively engaged by a first movable contact, and a second plurality of three stationary contacts selectively engaged by a second movable contact mechanically ganged together with said first movable contact, said first and second plurality of three stationary contacts having corresponding positions one, two, and three,
   (c) said first movable contact being connected to said student audio input means, three stationary contacts of said first plurality, corresponding to positions one, two and three, connected in common to the single contact of said program selector for coupling a selected program signal to said student audio input means when engaged by said first movable contact,
   (d) first and second conductors,
   (e) one of said stationary contacts of said second plurality connected through said first conductor to said recording means, another one of said stationary contacts of said second plurality connected through said second conductor to said teacher audio input means, a third one of said stationary contacts of said second plurality connected to an open circuit.

2. For use in a learning laboratory having a source of a plurality of instructive program signals, a teacher audio input means, output means and recording means and a plurality of student stations each having student audio input and output means; audio signal distribution apparatus for each of said student stations, each of said distribution apparatus comprising:
   (a) multiple position program selector means having a plurality of contacts each connected to one of said program signals and a single contact for selectively engaging said plural contacts,
   (b) multiple position function selector means having a first plurality of four stationary contacts selectively engaged by a first movable contact, and a second plurality of four stationary contacts selectively engaged by a second movable contact mechanically ganged together with said first movable contact, said first and second plurality of four stationary contacts having corresponding positions one, two, three and four, (c) said first movable contact being connected to said student audio input means, three stationary contacts of said first plurality, corresponding to positions one, two and three, connected in common to the single contact of said program selector for coupling a selected program signal to said student audio input means when engaged by said first movable contact, said first movable contact providing a make-before-break connection when switching between positions one, two and three, (d) three corresponding stationary contacts of said second plurality connected, respectively, to said recording means, said teacher audio input means and to an open-circuit, said second movable contact connected to said student audio output means, whereby the student audio output can be selectively recorded, monitored or open-circuited concurrent with an uninterrupted program signal being coupled to said student audio input when switching between said positions one, two and three, (e) the fourth contact of said first plurality connected to said teacher audio output and the fourth contact of said second plurality connected to said teacher audio input means, said first movable contact providing a break-before-make connection when switching between positions three and four, whereby two-way communication is effected between teacher and selected student when switching to position four without disturbing unselected students.

References Cited by the Examiner

UNITED STATES PATENTS 3,069,789  12/62  Knight et al. _____ 35—35.3
3,080,514  3/63   Foss et al. _____ 307—115 X

OTHER REFERENCES

RCA "Langauge Laboratory Systems" Installation Manual, dated June 1959; page 27 relied upon.

JEROME SCHNALL, *Primary Examiner.*

LAWRENCE CHARLES, *Examiner.*